(12) United States Patent
Pratt

(10) Patent No.: X4271
(45) Date of Patent: Nov. 22, 1825

(54) COMB, VICE USED IN CUTTING

(76) Inventor: Philo Pratt

United States Patent Patent No.: X4271

Philo Pratt
Letters Patent

The schedule referred to in these Letters Patent and making part of the same containing a description in the words of the said Philo Pratt himself, of his improvement in the motion of the comb vice used in his machine for cutting ivory combs, patented April the twentieth one thousand eight hundred and twenty-five, also in another machine patented September the ninth in the same year.

---

The machine on which this improvement is made is fully described in two patents granted to the subscriber and duly recorded in the proper office; one bearing date the 20th day of April A.D. 1825, and the other bearing date on the 9th day of September in the same year, to which a reference is made for a full description. The motion of the comb plate upon its axis referred to in the first patent, is to bring it upon the cutter in a manner more convenient for cutting the teeth accurately, expeditiously and square at the bottom. A tooth is cut on each side of the comb plate every complete revolution it makes.—
This improvement consists in causing the comb plate while turning upon its axis, to move through the different parts of the circle described by it unequally. If we suppose the comb plate at rest, standing perpendicularly in the vice, and to commence its operation from that position, it moves through the first quarter of the circle but half as fast as it moves through the second quarter; because during the first quarter, the comb plate is coming upon the cutter, & the tooth is cutting, & the motion should be slower; but as soon as the first quarter of the circle is finished, and the comb plate comes to a horizontal position, the tooth is cut & the comb plate instantly passes from the cutter through the second quarter of the circle, with double the velocity it passes through the first quarter. The other side of the comb plate performs the same revolutions. The comb plate in its revolutions, is made to gain in the second quarter of the circle, what it lost in the first so that it performs its revolutions in the same time with the revolutions of the screw shaft from which the motion is communicated & whose revolutions are equable through all parts of the circle..
This unequal motion of the comb plate while the teeth are cutting may be produced by placing upon the comb — shaft, & screw shaft, two ellipti-cal pinion wheels, in the places of the pulley wheels now upon those shafts, in such a manner that the pinions or cogs, on the short side of one of the ellipsis will play into the pinions or cogs, on the long side of the other ellipsis; or in other words, so that the longest diameter of one ellipsis, will come at right angles in the middle of the longest diameter of the other — -

This however is not the best or most convenient mode of producing the motion - The best mode of producing the desired motion, is, by placing on the two shafts in the place of the pullies used with a band to communicate motion from the screw shafts to the comb shafts, two double sectioned or compound pinion wheels, so that the longest part of each may play into the shortest part of the other - This produces the result with great accuracy. These double sectional or compound pinion wheels may be made in the following manner & of the following dimensions. The smallest is three quarters of an inch in diameter, and three sixteenths of an inch thick and has a neck or tenon projecting seven sixteenths of ~~an~~ inch from the right side of the wheel when standing edge towards you - This neck or tenon should be round, & the shoulder where it joins the wheel, half an inch in diameter; and the rest of the tenon is worked down so as to work easily in the hole or bearing made to receive it in the right post standing on the left poppet head plate. This wheel is divided so as to make sixteen cogs or pinions - four are cut about the tenth of an inch deep on each side of the wheel directly opposite each other - the rest of the wheel is filed down as low as the foot of the pin-ions - The second part of the pinion wheel is of the same thickness, with a tenon of the same size, projecting from the left side the same length. —

The diameter of this wheel is twice as large as that of the one last described. It is so divided as to make thirty-two cogs or pinions - Four cogs or pinions are cut on each side of the wheel directly opposite each other, in all respects like those in the wheel last described - These two pinion wheels are then put together & brazed, with their tenons turned outwards and their centres in a line with each other, & with the pinions or cogs on the small wheel standing in the middle of the space between the cogs on the large wheel - a square hole is then made thro' the centre of the wheels & tenons sufficiently large to receive the screw shaft described in said machine, and suffer it to slide smoothly and easily, through it. The pinion or cog wheel, when thus finished is placed between the two posts of the left poppet head of said machine, resting upon the Tenons placed in the bearings, in the posts of the poppet head made to receive them and with the smallest section of the wheel on the right side. The screw shaft is then placed in the mortice made to receive it. Two sim-ilar pinion wheels of the same size, and in all respects like the last, with the exception of the necks or projections, are then made and placed, and secured upon the left end of the comb shaft or, vice, with the largest section on the right side, so that the pinions on the largest section of this wheel will play into the pinions on the smallest section of the wheel on the screw shaft ---

The machine is then put in motion by the common and ordinary power applied to the comb shaft, as is set forth in the Patent before referred to, and the desired motion is produced in the comb plate while the teeth are cutting. By these means the comb shaft is made to perform two quick, and two slower motions every revolution & performs the same number of revolutions in the same Time, with the screw shaft, or shaft communicating the motion. The advantages of these unequal motions in the comb plate, while Turning to & from the cutter, are obvious - By this improvement the comb plate is made to move slowly while in contact with the cutter; but the moment it leaves the cutter; it requires sufficient celerity to recover what it lost while the tooth was cutting - The screw shaft performs a certain number of revolutions in a minute, and moves equally through each section of the circle described by its revolutions - The comb shaft is made to perform the same number of revolutions in the same period of Time, but in unequal motions in different sections of the circle described by its revolutions above set forth --

The plan of giving unequal motions to a comb plate while turning on its own axis for the purpose of cutting the teeth, and the above method of producing it, I claim as my invention.

Dated at Middletown October 18th 1825. as witness my hand & seal --

Witnesses
William Coles
Stephen I. Hosmer

Philo Pratt

Exd
T. S.

DRAFTSMAN'S DIVISION.

*All communications should be addressed to*
"The Commissioner of Patents, Washington, D. C."

**2—328 *a.***

*DEPARTMENT OF THE INTERIOR,*

United States Patent Office,

*Washington, D. C.,* ..............., *189*...

*SIR:*

*The printed* copies *of Patent No.* P Pratt
are *exhausted.* Nov 22 1825

*As soon as printed a copy will be mailed you to complete your order.*

*By direction of the Commissioner:*

*Very respectfully,*

*Chief Clerk.*

314306-97-5m